United States Patent
Steinmacher-Burow et al.

(10) Patent No.: US 11,316,713 B2
(45) Date of Patent: Apr. 26, 2022

(54) VIRTUAL DRAWERS IN A SERVER

(71) Applicant: International Business Machines Corporation, Armonk, NY (US)

(72) Inventors: Burkhard Steinmacher-Burow, Esslingen am Neckar (DE); Harald Huels, Horb (DE)

(73) Assignee: International Business Machines Corporation, Armonk, NY (US)

(*) Notice: Subject to any disclaimer, the term of this patent is extended or adjusted under 35 U.S.C. 154(b) by 223 days.

(21) Appl. No.: 16/695,135

(22) Filed: Nov. 25, 2019

(65) Prior Publication Data

US 2021/0160100 A1 May 27, 2021

(51) Int. Cl.
| | |
|---|---|
| *H04L 12/46* | (2006.01) |
| *H04L 45/02* | (2022.01) |
| *H04L 45/745* | (2022.01) |
| *H04L 41/12* | (2022.01) |
| *H04L 45/586* | (2022.01) |
| *H04L 49/00* | (2022.01) |

(52) U.S. Cl.
CPC .......... *H04L 12/4641* (2013.01); *H04L 41/12* (2013.01); *H04L 45/02* (2013.01); *H04L 45/586* (2013.01); *H04L 45/745* (2013.01); *H04L 49/70* (2013.01)

(58) Field of Classification Search
CPC ....... H04L 12/46; H04L 45/02; H04L 45/745; H04L 41/12; H04L 45/586; H04L 49/70; H04L 41/0806
See application file for complete search history.

(56) References Cited

U.S. PATENT DOCUMENTS

| | | | | |
|---|---|---|---|---|
| 5,969,720 | A | 10/1999 | Lisle | |
| 6,961,785 | B1* | 11/2005 | Arndt | G06F 13/12 710/104 |
| 2007/0061441 | A1* | 3/2007 | Landis | G06F 9/45558 709/224 |
| 2007/0244701 | A1 | 10/2007 | Erlanger | |
| 2009/0037682 | A1* | 2/2009 | Armstrong | G06F 9/45558 711/164 |
| 2010/0083252 | A1* | 4/2010 | Eide | G06F 9/45558 718/100 |

(Continued)

OTHER PUBLICATIONS

"Arista 7500R Switch Architecture ('A day in the life of a packet')," Arista, printed Aug. 27, 2019, 20 pages. <https://www.arista.com/assets/data/pdf/Whitepapers/Arista7500RSwitchArchitectureWP.pdf>.

(Continued)

*Primary Examiner* — Jael M Ulysse
(74) *Attorney, Agent, or Firm* — Scott Dobson (57) ABSTRACT

A computer-implemented method comprises receiving an index number for each of a plurality of physical processing units, each of the plurality of physical processing units communicatively coupled to each of a plurality of switch chips in a leaf-spine topology; assigning at least one of the plurality of physical processing units to a first virtual drawer by updating an entry in a virtual drawer table indicating an association between the respective index number of the at least one physical processing unit and an index of the first virtual drawer; and performing a drawer management function based on the virtual drawer table.

18 Claims, 4 Drawing Sheets

(56) References Cited

U.S. PATENT DOCUMENTS

| | | | | |
|---|---|---|---|---|
| 2011/0134793 | A1* | 6/2011 | Elsen | H04L 49/70 370/254 |
| 2012/0311226 | A1* | 12/2012 | Itakura | G06F 11/2033 710/316 |
| 2013/0215754 | A1* | 8/2013 | Tripathi | H04L 69/22 370/236 |
| 2014/0047201 | A1* | 2/2014 | Mehta | G06F 3/067 711/158 |
| 2014/0075047 | A1* | 3/2014 | Narasimhan | G06F 11/203 709/238 |
| 2014/0092901 | A1* | 4/2014 | Kapadia | H04L 49/356 370/390 |
| 2014/0101302 | A1* | 4/2014 | Yang | H04L 45/02 709/224 |
| 2014/0281365 | A1* | 9/2014 | Mashey | G06F 3/0685 711/207 |
| 2015/0043581 | A1* | 2/2015 | Devireddy | H04L 49/70 370/392 |
| 2015/0124820 | A1* | 5/2015 | Alizadeh Attar | H04L 61/6095 370/392 |
| 2015/0188817 | A1* | 7/2015 | Parker | H04L 45/10 709/238 |
| 2016/0021032 | A1* | 1/2016 | Maier | H04L 49/70 370/401 |
| 2016/0147662 | A1* | 5/2016 | Drapala | G06F 12/0815 711/122 |
| 2017/0031620 | A1* | 2/2017 | Yu | G06F 1/3287 |
| 2017/0094010 | A1* | 3/2017 | Dinan | H04L 67/2852 |
| 2017/0237626 | A1* | 8/2017 | Nair | H04L 41/0893 370/255 |
| 2019/0028351 | A1* | 1/2019 | Casado | H04L 45/586 |
| 2019/0037033 | A1* | 1/2019 | Khakimov | H04L 61/256 |
| 2020/0195582 | A1* | 6/2020 | Marks | H04L 45/74 |
| 2020/0358702 | A1* | 11/2020 | Agrawal | H04L 49/354 |

OTHER PUBLICATIONS

"Cisco Network Convergence System NCS 5500 Modular Platform Architecture," Cisco, printed Aug. 27, 2019, 17 pages. <https://www.cisco.com/c/dam/en/us/products/collateral/routers/network-convergence-system-5500-series/ncs5500-modular-platform-architecture-white-paper.pdf>.

"Direct Plug Orthogonal Backplane Solutions Provide Best in Class Electrical Performance and Density," TE Connectivity, Apr. 4, 2016, 2 pages. <https://www.te.com/usa-en/about-te/news-center/strada-whisper-direct-plug-orthogonal-dpo-connectors.html>.

"Division of Labour," Wikipedia, printed Aug. 27, 2019, 13 pages. <https://en.wikipedia.org/wiki/Division_of_labour>.

"Impulse Direct Backplane Connector System and Cable Assemblies," Molex, printed Aug. 27, 2019, 2 pages. <www.literature.molex.com/SQLImages/kelmscott/Molex/PDF_Images/987651-6082.PDF>.

"Intelligent Platform Management Interface," Wikipedia, printed Aug. 27, 2019, 5 pages. <https://en.wikipedia.org/wiki/Intelligent_Platform_Management_Interface>.

"Nvidia tesla v100—AWS," Image on p. 35, printed Aug. 27, 2019, 1 page. <cms.ipressroom.com.s3.amazonaws.com/219/files/20182/JHH_GTC2018_FINAL2.pdf>.

"NVIDIA Tesla V100 GPU Archtecture," NVIDIA.com, Aug. 2017, 58 pages. <images.nvidia.com/content/volta-architecture/pdf/volta-architecture-whitepaper.pdf>.

"Out-of-band management," Wikipedia, printed Aug. 27, 2019, 2 pages. <https://en.wikipedia.org/wiki/Out-of-band_management>.

"PV® Wire-to-Board Connector System," Amphenol ICC, printed Aug. 27, 2019, 5 pages. <https://www.amphenol-icc.com/media/wysiwyg/files/documentation/datasheet/boardwiretoboard/bwb_pv_wtb.pdf>.

"SAP Standard Application Benchmarks," SAP.com, printed Aug. 27, 2019, 3 pages. <https://www.sap.com/about/benchmark.html>.

Andreyev, "Introducing data center fabric, the next-generation Facebook data center network," Facebook Engineering, Nov. 14, 2014, 7 pages. <https://engineering.fb.com/production-engineering/introducing-data-center-fabric-the-next-generation-facebook-data-center-network/>.

Babcock, "IBM DB2's 25th Anniversary: Birth of an Accidental Empire," InformationWeek.com, Jun. 9, 2008, 2 pages. <https://www.informationweek.com/ibm-db2s-25th-anniversary-birth-of-an-accidental-empire/d/d-id/1068685>.

Cicznicki et al., "Methods to Load Balance a GCR Pressure Solver Using a Stencil Framework on Multi- and Many-Core Architectures," Scientific Programming , Nov. 2015, pp. 1-13. <https://www.researchgate.net/publication/284559557_Methods_to_Load_Balance_a_GCR_Pressure_Solver_Using_a_Stencil_Framework_on_Multi-_and_Many-Core_Architectures>.

Codd, "A Relational Model of Data for Large Shared Data Banks," Communications of the ACM, vol. 16, Issue 6, Jun. 1970, pp. 377-387 <https://dl.acm.org/citation.cfm?id=362685>.

Dashti et al, "Traffic Management: A Holistic Approach to Memory Placement on NUMA Systems," Proceedings of the eighteenth international conference on Architectural support for programming languages and operating systems, vol. 48, Apr. 2013, 13 pages. <https://dl.acm.org/citation.cfm?id=2451157>.

Deierling, "In Modern Datacenters, The Latency Tail Wags the Network Dog," The Next Platform, Mar. 27, 2018, 10 pages. <https://www.nextplatform.com/2018/03/27/in-modern-datacenters-the-latency-tail-wags-the-network-dog/>.

Dong et al., "Venice: Exploring Server Architectures for Effective Resource Sharing," 2016 IEEE International Symposium on High Performance Computer Architecture, Mar. 12-16, 2016, 12 pages. <http://www.cse.chalmers.se/~mckee/papers/hpca16.pdf>.

Gough et al., "BIOS and Management Firmware," Energy Efficient Servers, Apr. 7, 2015, 21 pages. <https://link.springer.com/chapter/10.1007/978-1-4302-6638-9_5#citeas>.

Hanks, "Juniper QFX10000 Series," O'Reilly.com, printed Aug. 27, 2019, p. 39. <https://www.oreilly.com/library/view/juniper-qfx10000-series/9781491922248/ch01.html>.

Harris, "Inside Pascal: NVIDIA's Newest Computing Platform," NVIDIA Developer Blog, Apr. 5, 2016, 15 pages. <https://devblogs.nvidia.com/inside-pascal/>.

Ishii et al., "NVSWITCH and DGX-2 NVLINK-Switching Chip and Scale-Up Compute Server," NVIDIA, printed Aug. 29, 2019, 30 pages. <www.hotchips.org/hc30/2conf/2.01_Nvidia_NVswitch_HotChips2018_DGX2NVS_Final.pdf>.

Kim, "High Radix Interconnection Networks," Stanford University Department of Electrical Engineering and the Committee on Graduate Studies, Mar. 2008, 158 pages. <http://cva.stanford.edu/publications/2008/jkim_thesis.pdf>.

Kothe et al., "Exascale Computing Project Update," Exascale Computing Project, Dec. 20, 2017, 32 pages. <http://science.energy.gov/~/media/ascr/ascac/pdf/meetings/201712/ECP_Update_ASCAC_20171220.pdf>.

Lascu et al., "IBM z14 (3906)Technical Guide," IBM Redbooks, Oct. 2018, pp. 4, 6, 9, 10, 12, 13, 41,44, 55, 57, 62, 68, 125, 188, and 266. <www.redbooks.ibm.com/redbooks/pdfs/sg248451.pdf>.

Liu et al., "An Early Performance Study of Large-Scale POWER8 SMP Systems," 2016 IEEE International Parallel and Distributed Processing Symposium (IPDPS), May 23-27, 2016, # pages. <ieeexplore.ieee.org/document/7516022>.

Morgan, "Cray CTO Connects the Dots on Future Interconnects," The Next Platform, Jan. 8, 2016, 17 pages. <https://www.nextplatform.com/2016/01/08/cray-cto-connects-the-dots-on-future-interconnects/>.

Morgan, "More Knights Landing Xeon Phi Secrets Unveiled," The Next Platform, Mar. 25, 2015, 8 pages. <https://www.nextplatform.com/2015/03/25/more-knights-landing-xeon-phi-secrets-unveiled/>.

Morgan, "Power9 Big Iron "Fleetwood/Mack" Rumors," IT Jungle, Oct. 9, 2017, 5 pages. <https://www.itjungle.com/2017/10/09/power9-big-iron-fleetwoodmack-rumors/>.

Plattner, "The Impact of Intel's Haswell Architecture on SAP's HANA (SP10)," SAP HANA Blog, Jun. 29, 2015, 9 pages. <https://blogs.saphana.com/2015/06/29/impact-of-haswell-on-hana/>.

(56) References Cited

OTHER PUBLICATIONS

Russell, "HPC User Forum Presses NSCI Panelists on Plans," HPC Wire, Sep. 17, 2015, 5 pages. <https://www.hpcwire.com/2015/09/17/hpc-user-forum-presses-nsci-panelists-on-plans/>.

Schor, "POWER9 Scales Up to 1.2 TB/s of I/O, Targets NVLink 3, OpenCAPI Memory for 2019," WikiChip, Oct. 7, 2018, 4 pages. <https://fuse.wikichip.org/news/1653/power9-scales-up-to-1-2-tb-s-of-i-o-targets-nvlink-3-opencapi-memory-for-2019/>.

Teich, "Building Bigger, Faster GPU Clusters Using NVSwitches," The Next Platform, Apr. 13, 2018, 17 pages. <https://www.nextplatform.com/2018/04/13/building-bigger-faster-gpu-clusters-using-nvswitches/>.

Thomas, "Getting Started with Performance and Scalability at SAP," SAP Community, Apr. 10, 2012, 3 pages. <https://blogs.sap.com/2012/04/10/getting-started-with-performance-and-scalability-at-sap/>.

Watts, "Lenovo System x3950 X6 (6241)," Lenovo Press, Apr. 18, 2019, 59 pages. <lenovopress.com/tips1251-system-x3950-x6-6241/>.

Yao et al., "Facebook—Backpack 128 x 100GE Modular Switch," Open Compute Project, Feb. 18, 2017, p. 155. <https://www.circleb.eu/wp-content/uploads/2017/03/Backpack_OCP_Spec_v1.10.pdf>.

"ExaMAX® 56Gb/s High Speed Orthogonal Connector System," Amphenol Information Communications and Commercial Products, accessed Nov. 25, 2019, 6 pages. <https://www.amphenol-icc.com/media/wysiwyg/files/documentation/datasheet/backplane/bpl_examax_orthogonal.pdf>.

"Red Hat Enterprise Linux Non-Uniform Memory Access support for HP ProLiant servers," HP, accessed Nov. 25, 2019, 45 pages. <https://h50146.www5.hpe.com/products/software/oe/linux/mainstream/support/whitepaper/pdfs/4AA5-4681ENW-jan.pdf>.

International Search Report and Written Opinion dated Feb. 25, 2021, for International Application No. PCT/IB2020/061023, filed Nov. 23, 2020.

LINUX, Nov. 1, 2015, 10 pps., Hewlett-Packard Company, <https://www.hpe.com/jp/ja/servers/linux/technical.html%20translated%20to%20english>.

Vogel et al., "Leader 2021 Gartner® Magic Quadrant™ for Primary Storage", Published Oct. 11, 2021,, Gartner Report, © 2022 Pure Storage, Inc., 7 pps., <https://www.purestorage.com/resources/gartner-magic-quadrant-primary-storage.html?utm_medium=banner&utm_source=theregister&utm_campaign=e4a&utm_region=ams&utm_content=prospecting&utm_creative=default&utm_term=2021gmqfa&ulm_keyword=detault>.

* cited by examiner

VIRTUAL DRAWERS IN A SERVER

BACKGROUND

Conventional large servers are packaged or physically constructed by cabling together 2 or more physical drawers. A physical drawer can contain 1 or more central processing unit (CPU) chips. Typically, each CPU chip is connected to memory chips and each CPU chip has connectors, such as PCIe connectors, for expansion cards. Additionally, each CPU chip has 1 or more symmetric multiprocessing (SMP) links to other CPU chips. Within a drawer, an SMP link can implemented using board traces. Across 2 drawers, an SMP link can use a cable.

SUMMARY

Aspects of the disclosure may include a computer-implemented method, computer program product, and system. One example of the computer-implemented method comprises receiving an index number for each of a plurality of physical processing units, each of the plurality of physical processing units communicatively coupled to each of a plurality of switch chips in a leaf-spine topology; assigning at least one of the plurality of physical processing units to a first virtual drawer by updating an entry in a virtual drawer table indicating an association between the respective index number of the at least one physical processing unit and an index of the first virtual drawer; and performing a drawer management function based on the virtual drawer table.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In some conventional systems, a computer system is packaged using a plurality of physical drawers (also referred to as physical books, boards, islands). Each physical drawer contains a plurality of computer processing unit (CPU) chips. For example, in some conventional systems, each physical drawer includes two clusters of CPU chips with 3 CPU chips in each cluster. In some such systems, each CPU chip is communicatively coupled to the other CPU chips in its cluster and to a switch chip which is in turn communicatively coupled to switch chips in other physical drawers. It is to be understood that other conventional systems can include other topologies (e.g. more or fewer CPU chips in each drawer, different connections between switch chips and CPU chips, etc.). However, such conventional systems, regardless of the specific topology, utilize the physical drawer concept for management functions, as known to one of skill in the art. For example, logical partitions can use all or part of multiple drawers. Similarly, an existing partition with a running workload can add an additional drawer. Additionally, the layout of addresses in memory typically uses the physical drawer topology. In particular, addresses are contiguous and interleaved across CPU chips within a drawer. Furthermore, the physical drawer concept can be used to implement Reliability & Availability & Serviceability (RAS). Other management functions can also be implemented using the physical drawer concept, such as but not limited to software licenses or other business aspects.

However, the reliance on physical drawers also has limitations, such as, but not limited to, on performance of a given workload for a server. For example, there can be inefficiencies by executing a workload across physical drawers. In particular, a CPU pair connected within a physical drawer typically has a higher bandwidth than a CPU pair connected across physical drawers. As a result, typically there is an effort to fit a workload to a single drawer. However, a large server does not necessarily correspond to a single physical drawer. Thus, a physical drawer in such a server fits a smaller workload than the server. Additionally, for a given server size, the number of physical drawers in the server is determined by the physical packaging. However, a given workload may be more efficiently executed with a larger or smaller number of physical drawers than are present in the server. Furthermore, the physical drawer size is fixed and is determined by the packaging. Software or services in other layers of the solution stack may have improved performance with smaller or larger drawer sizes than the fixed physical drawer size determined by the packaging. In other words, some workloads may be able to be run with fewer CPU chips and resources than are included in a physical drawer of a server while others would run better with more CPU chips and resources than are included in the physical drawer of the server. However, using less than all of the resources of a physical drawer on a workload is not efficient and spreading a workload across physical drawers also introduces efficiencies due, for example, to potential bottlenecks at the switch chips communicatively coupling the physical drawers to each other.

Figure 1:
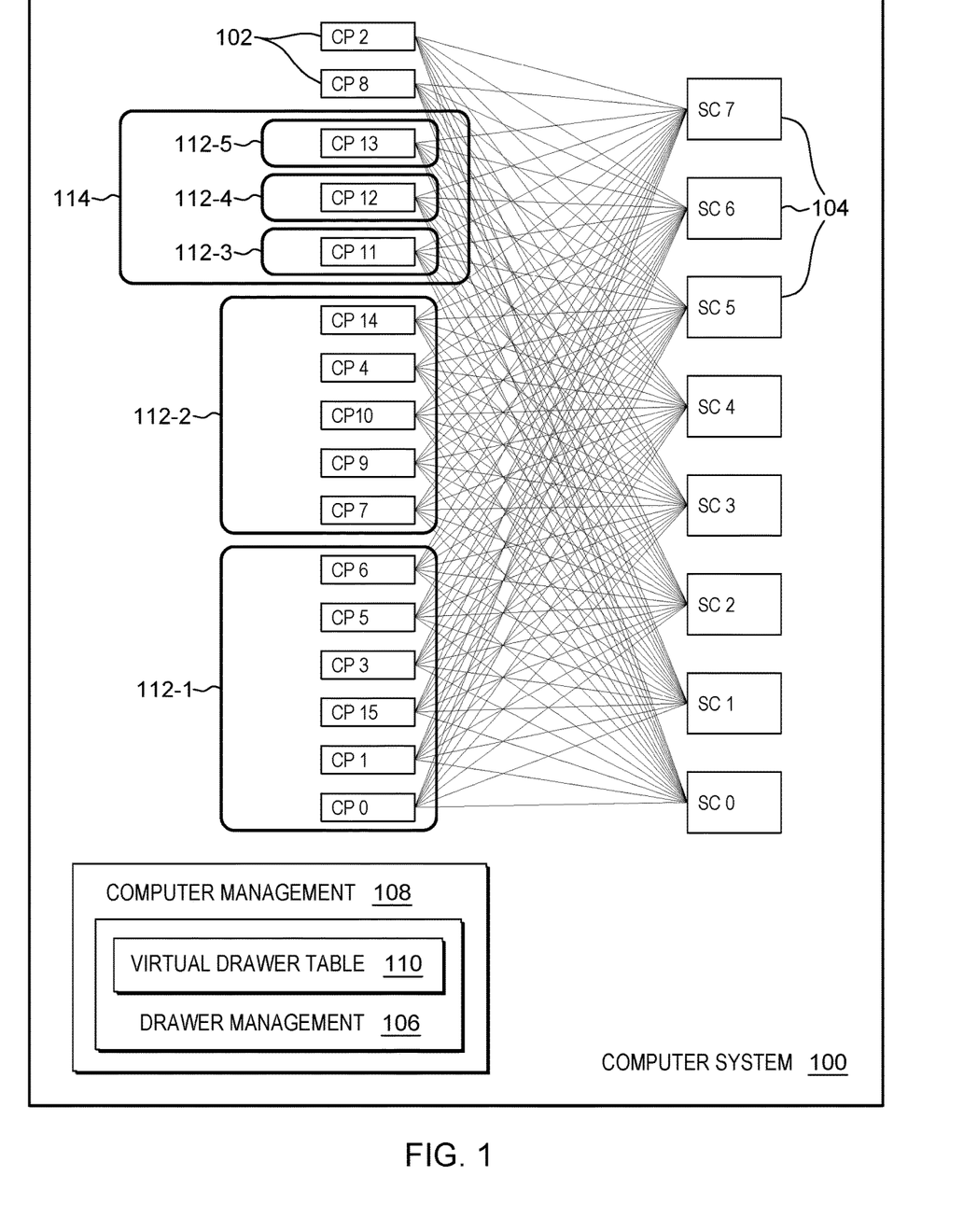
FIG. 1 depicts one embodiment of an example computer system utilizing virtual drawers.

The embodiments described herein enable the beneficial use of a drawer concept for management functions while addressing limitations of the physical drawer by enabling the decoupling of the drawer concept from the physical packaging. In particular, the embodiments described herein enable the use of virtual drawers. For example, FIG. 1 depicts one embodiment of an example computer system 100 utilizing virtual drawers. In particular, FIG. 1 depicts one example of a leaf-spine computer system or a leaf-spine server. The system 100 leverages a leaf-spine topology in which each of a plurality of CPU chips 102 (labelled CP 0 to CP 15 in this example) is communicatively coupled with each of a plurality of switch chips 104 (labelled SC 0 to SC 7 in this example). In this way, any two or more CPU chips 102 can be communicatively coupled to one another. Each CPU chip 102 can be a single-chip-module (SCM) in some embodiments, or a dual-chip-module (DCM), in other embodiments.

The computer system 100 includes a computer management module 108 configured to perform management functions for the system 100 similar to conventional computer management modules. However, the computer management module 108 in the example embodiment of FIG. 1 includes include a drawer management module 106 which utilizes a virtual drawer table 110 to manage the dynamic creation/management of virtual drawers. For example, the drawer management module 106 can group one or more of the CPU chips 102 into respective virtual drawers. In the example, shown in FIG. 1, drawer management module 106 groups a subset of the CPU chips 102 into 5 virtual drawers, 112-1 . . . 112-5 (referred to collectively as virtual drawers 112). As can be seen in FIG. 1, each of the virtual drawers 112 does not have to have the same number of CPU chips 102. In particular, a virtual drawer 112 can include a single CPU chip 102, such as virtual drawers 112-3, 112-4, and 112-5, or a plurality of CPU chips 102, such as virtual drawers 112-1 and 112-2. In some embodiments, all of the CPU chips 102 can be included in a single virtual drawer 112. Thus, the number of CPU chips 102 in a virtual drawer as well as the number of virtual drawers 112 can vary in different embodiments to more efficiently manage the workloads assigned to the computer system 100, for example.

Additionally, a logical partition (LPAR), such as LPAR 114, can be assigned one or more virtual drawers 112. Thus, as with conventional systems, drawers can be added to a LPAR. However, by decoupling the virtual drawers 112 from the physical packaging, each virtual drawer can contain different numbers of CPU chips 102, as discussed above. Thus, the LPAR 114, for example, can contain 3 virtual drawers 112-3 . . . 112-5, with each virtual drawer containing a single CPU chip 102.

Furthermore, by enabling virtual drawers which are decoupled from the physical packaging, a given virtual drawer can contain CPU chips 102 which utilize different Instruction Set Architectures (ISA), in some embodiments. For example, in FIG. 1, virtual drawer 112-2 includes CP 9 and CP 10 which implement an x86 architecture as well as CP 7, CP 4, and CP 14 which implement a z/Architecture. Thus, in some embodiments, each CPU chip 102 in a given virtual drawer implements the same ISA whereas, in other embodiments, CPU chips in a given virtual drawer can implement different ISA. In this way, the computer system 100 enables greater flexibility in meeting requirements of workloads.

In addition, the use of virtual drawers decoupled from the physical packaging enables greater flexibility in fault recovery and maintenance. For example, if a given CPU chip 102 in a virtual drawer fails, that CPU chip 102 can be replaced by another CPU chip 102. For example, a CPU chip not currently assigned to a virtual drawer can replace the failed CPU chip or a CPU chip in another virtual drawer can be reassigned to replace the failed CPU chip. Additionally, failure of a CPU chip 102, an SC chip 104, or a link between a CPU chip 102 and an SC chip 104 can be mitigated more efficiently than with physical drawers. In particular, such a failure impacts only one CPU chip 102 or SC chip 104 rather than all the CPU chips in a physical drawer. Additionally, for performing maintenance in which a CPU chip 102 is to be powered off (e.g. to replace hardware), the computer management module 108 is able to power off selected CPU chips 102 with finer granularity than in conventional physical drawers since the entire virtual drawer 112 does not necessarily need to be powered off (e.g. when the virtual drawer 112 contains a plurality of CPU chips 102 on different boards).

Grouping or assigning CPU chips 102 to a virtual drawer 112 includes, in some embodiments, laying out addresses in memory such that within a virtual drawer 112 the addresses are contiguous and interleaved across the CPU chips 102 that are assigned to the virtual drawer 112. That is, each CPU chip 102 can include memory storage and the drawer management module 108 can configure the total storage as a single contiguous address space with the addresses of consecutive memory blocks interleaved over the CPU chips 102 of the respective virtual drawer 112. Thus, even though the CPU chips 102 in a given virtual drawer 112 may not be on the same physical board, the layout of the memory addresses is still contiguous and interleaved across the CPU chips 102 in the virtual drawer 112.

Furthermore, the computer management module 108 can manage the CPU chips 102 and present the CPU chips 102 to an administrator in terms of the virtual drawers 112. Thus, the computer management module 108 is able to perform similar management functions with the virtual drawers as conventional computer management modules utilize physical drawers. For example, the virtual drawers 112 can be used to implement RAS similar to the manner in which physical drawers are used to implement RAS.

The drawer management module 106 creates/manages the virtual drawers 112 through the use of one or more virtual drawer tables 110, as discussed above. One example virtual drawer table is depicted below as Table 1. Table 1 depicts an example mapping of physical CPUs to virtual drawers. Thus, Table 1 can be referred to herein as a C2V Table. In particular, Table 1 depicts the example mapping for the CPU chips 102 of FIG. 1.

TABLE 1

| | C2VTable (—=Not Configured) | |
|---|---|---|
| Row is Physical CPU index | Vdrawer index | VCPU index |
| 0 | 3 | 0 |
| 1 | 3 | 1 |
| 2 | — | — |
| 3 | 3 | 3 |
| 4 | 2 | 3 |
| 5 | 3 | 4 |
| 6 | 3 | 5 |
| 7 | 2 | 0 |
| 8 | — | — |
| 9 | 2 | 1 |
| 10 | 2 | 2 |
| 11 | 15 | 0 |
| 12 | 13 | 0 |
| 13 | 10 | 0 |
| 14 | 2 | 4 |
| 15 | 3 | 2 |

The first column in Table 1 indicates an index for each physical CPU chip 102. It is to be understood that, in some embodiments, the values in the first column are not stored in Table 1. Instead, each value in the first column illustrates that the "Physical CPU index" value is used as the row offset into Table 1 to directly access the Vdrawer and VCPU entries corresponding to the given physical CPU. The second column indicates a virtual drawer index. In particular, each virtual drawer is configured with a unique virtual drawer index. For example, virtual drawer 112-1 in FIG. 1 is assigned a virtual drawer index of 3. As shown in FIG. 1, the CPU chips CP 0, CP 1, CP 15, CP 3, CP 5, and CP 6 have been assigned to virtual drawer 112-1. Thus, in Table 1, column 2 corresponding to each of those CPU chips includes the entry of virtual drawer index 3. Similarly, each of the CPU chips 102 included in virtual drawer 112-2 is assigned the virtual drawer index 2. Virtual drawers 112-3, 112-4, and 112-5 are assigned virtual index 15, 13, and 10, respectively. Thus, the CPU chips 102 corresponding to each of virtual drawers 112-3, 112-4, and 112-5 include the corresponding virtual drawer index in column 2. CPU chips CP 2 and CP 8 have not been assigned to a virtual drawer. Thus, column 2 corresponding to each of CP 2 and CP 8 does not include an entry.

In addition, Table 1 includes a third column for a virtual CPU index. That is, within a virtual drawer, each CPU chip 102 is assigned a virtual CPU index. For example, virtual drawer 112-1 includes six CPU chips 102. Thus, each of the six CPU chips is assigned a consecutive virtual CPU index. In this example, the consecutive virtual CPU indices begin with 0 and are incremented by 1 until the last CPU chip in the virtual drawer is assigned a virtual CPU index. Thus, for the example virtual drawer 112-1, CP 0 is assigned the virtual CPU (VCPU) index 0; CP 1 is assigned the VCPU index 1 CP 15 is assigned the VCPU index 2; CP 3 is assigned the VCPU index 3; CP 5 is assigned the VCPU index 4; and CP 6 is assigned the VCPU 5. Similar assignments of VCPU indices are made for the other virtual drawers 112. Notably, the VCPU index is unique within a given virtual drawer, but is not globally unique. That is, each virtual drawer can include a VCPU index 0, for example, but there is only one VCPU index 0 for a given virtual drawer. The VCPU index helps organize and identify the CPU chips 102 within a given virtual drawer 112.

Table 2 is another example virtual drawer table which can be utilized by drawer management module 106. Table 2 depicts an example mapping of virtual drawer to physical CPU. Thus, Table 2 can be referred to as a V2C Table. As with Table 1, Table 2 depicts an example mapping for the CPU chips 102 of FIG. 1.

Table 2. Instead, each value in the first column illustrates that the "Vdrawer index" value is used as the row offset into Table 2 to directly access the VCPU number and physical CPU index entries corresponding to a given virtual drawer. In some embodiments, the number of available virtual drawer (Vdrawer) indices is equal to the number of CPU chips 102. In that way, it is possible to configure each virtual drawer 112 to contain only a single CPU chip 102. However, as seen in Table 2, some of the Vdrawer indices are not utilized when one or more virtual drawers includes more than one CPU chip 102. The second column of Table 2 indicates the number of CPU chips in the virtual drawer. The subsequent columns after column 2 indicate a VCPU index. The entry for each row in these subsequent columns is the physical CPU index of the corresponding CPU chip 102. For example, as discussed above with respect to Table 1, in virtual drawer 3, the VCPU 0 index corresponds to the physical CPU index 0 (CP 0).

Figure 2:
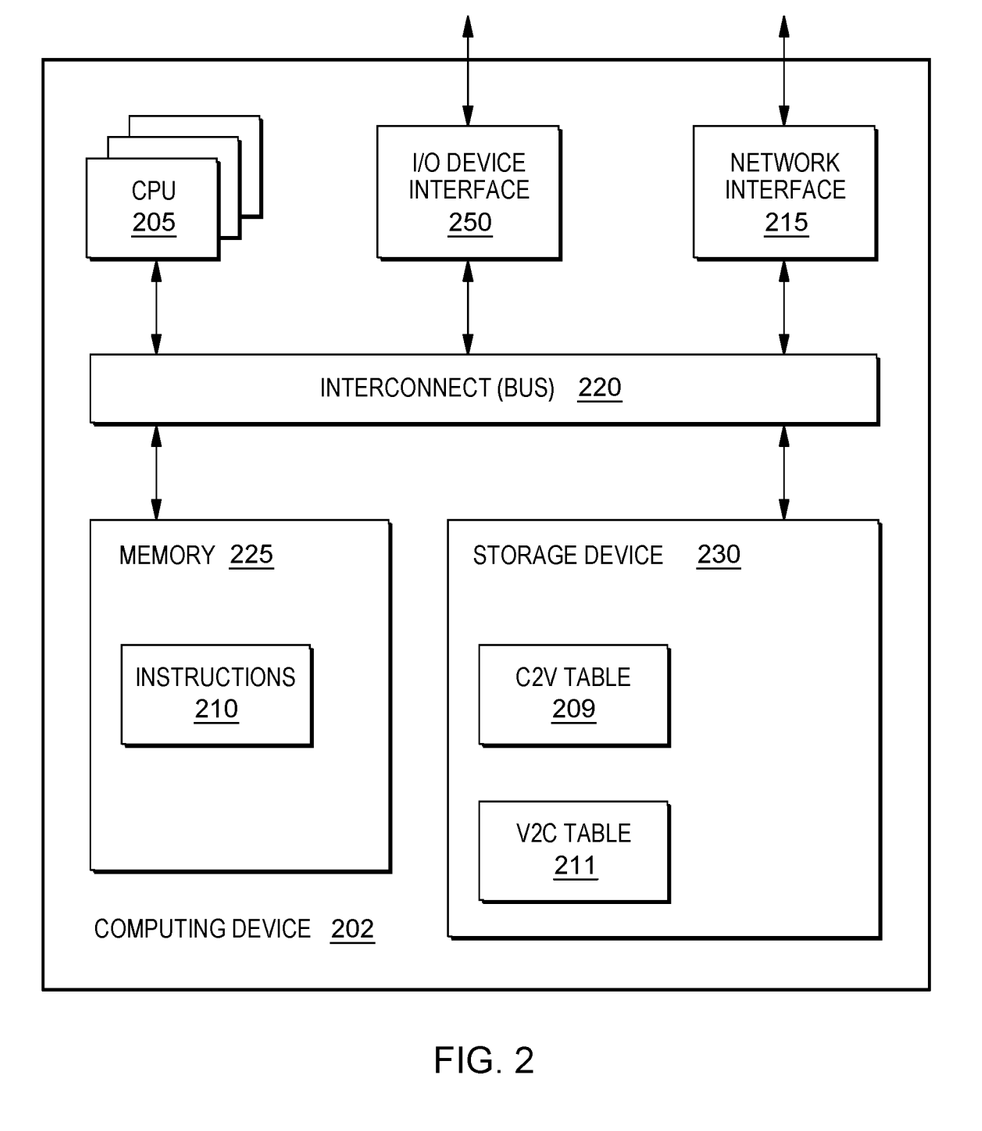
FIG. 2 is a high-level block diagram of one embodiment of an example computing device.

Thus, Tables 1 and 2 enable the drawer management module 106 to organize, create, and manage the virtual drawers 112. Indeed, by adjusting entries in Tables 1 and 2, the drawer management module 106 is able to update existing virtual drawers, create a new virtual drawer, or remove a virtual drawer. It is to be understood that Tables 1 and 2 are provided by way of example only and that, in other embodiments, the Tables 1 and 2 can be configured differently. Furthermore, in some embodiments, the drawer management module 106 is configured to utilize both a C2V table and a V2C table. For example, through the use of both a C2V table and a V2C table, the drawer management module 106 is able to efficiently look up information in different scenarios. For example, if a virtual drawer index is provided, the drawer management module 106 can identify the indices of the corresponding physical CPUs by using the V2C table. Similarly, if a physical CPU index is provided, the drawer management module 106 can identify the corresponding virtual drawer using the C2V table. However, in other embodiments, the drawer management module 106 is configured to manage the virtual drawers utilizing only one of a C2V table or a V2C table. In addition, it is to be understood that although FIG. 1 and FIG. 2 are discussed

TABLE 2

| Vdrawer index | Number of VCPU | V2CTable (—=Not Configured) Column is VCPU index. Entry is Physical CPU index. | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | — | | | | | | | z | z | z | z | z | z | z | z | z | z |
| 1 | — | | | | | | | | | | | | | | | | |
| 2 | 5 | 7 | 9 | 10 | 4 | 14 | | | | | | | | | | | |
| 3 | 6 | 0 | 1 | 15 | 3 | 5 | 6 | | | | | | | | | | |
| 4 | — | | | | | | | | | | | | | | | | |
| 5 | — | | | | | | | | | | | | | | | | |
| 6 | — | | | | | | | | | | | | | | | | |
| 7 | — | | | | | | | | | | | | | | | | |
| 8 | — | | | | | | | | | | | | | | | | |
| 9 | — | | | | | | | | | | | | | | | | |
| 10 | 1 | 13 | | | | | | | | | | | | | | | |
| 11 | — | | | | | | | | | | | | | | | | |
| 12 | — | | | | | | | | | | | | | | | | |
| 13 | 1 | 12 | | | | | | | | | | | | | | | |
| 14 | — | | | | | | | | | | | | | | | | |
| 15 | 1 | 11 | | | | | | | | | | | | | | | |

The first column in Table 2 indicates a virtual drawer index. As with Table 1, it is to be understood that in some embodiments, the values in the first column are not stored in with respect to 16 physical CPU chips and 8 SC chips, other embodiments can include other numbers of physical CPU chips and/or other number of SC chips.

The computer management module 108 and the drawer management module 106 can be implemented in hardware, software, or a combination of hardware and software. For example, in some embodiments, the computer management module 108 and drawer management module 106 can be implemented by software executing on one or more of CPU chips 102. In other embodiments, the computer management module 108 and drawer management module 106 can be implemented as software or firmware executing on a separate processing unit. For example, in some embodiments, the computer management module 108 and the drawer management module 106 are implemented as firmware utilizing a baseboard management controller (BMC) of an Intelligent Platform Management Interface (IPMI) sub-system. One example computing device configured to implement the computer management module 108 and the drawer management module 106 is described below with respect to FIG. 2.

FIG. 2 is a high-level block diagram of one embodiment of an example computing device 200. In the example shown in FIG. 2, the computing device 200 includes a memory 225, storage 230, an interconnect (e.g., BUS) 220, one or more processors 205 (also referred to as CPU 205 herein), and a network interface 215. It is to be understood that the computing device 200 is provided by way of example only and that the computing device 200 can be implemented differently in other embodiments. For example, in other embodiments, some of the components shown in FIG. 2 can be omitted and/or other components can be included.

Each CPU 205 retrieves and executes programming instructions stored in the memory 225 and/or storage 230. The interconnect 220 is used to move data, such as programming instructions, between the CPU 205, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the computing device 200 via a communication network coupled to the network interface 215.

In some embodiments, the memory 225 stores instructions 210 and the storage 230 stores C2V table 209 and V2C table 211. The C2V table 209 and the V2C table 211 can be implemented similar to Tables 1 and 2 described above. In other embodiments, the instructions 210, the C2V table 209 and the V2C table 211 are stored partially in memory 225 and partially in storage 230, or they are stored entirely in memory 225 or entirely in storage 230, or they are accessed over a network via the network interface 215.

When executed, the instructions 210 cause the CPU 205 to manage virtual drawers as discussed above. In particular, the instructions 210 cause the CPU 205 to implement the computer management module 108 and the drawer management module 106 discussed above. Further details regarding operation of the computing device 200 are also described below with respect to method 400.

Furthermore, as discussed above, in some embodiments, one or more of the components and data shown in FIG. 2 include instructions or statements that execute on the processor 205 or instructions or statements that are interpreted by instructions or statements that execute on the processor 205 to carry out the functions as described herein. In other embodiments, one or more of the components shown in FIG. 2 are implemented in hardware via semiconductor devices, chips, logical gates, circuits, circuit cards, and/or other physical hardware devices in lieu of, or in addition to, a processor-based system.

Figure 3:
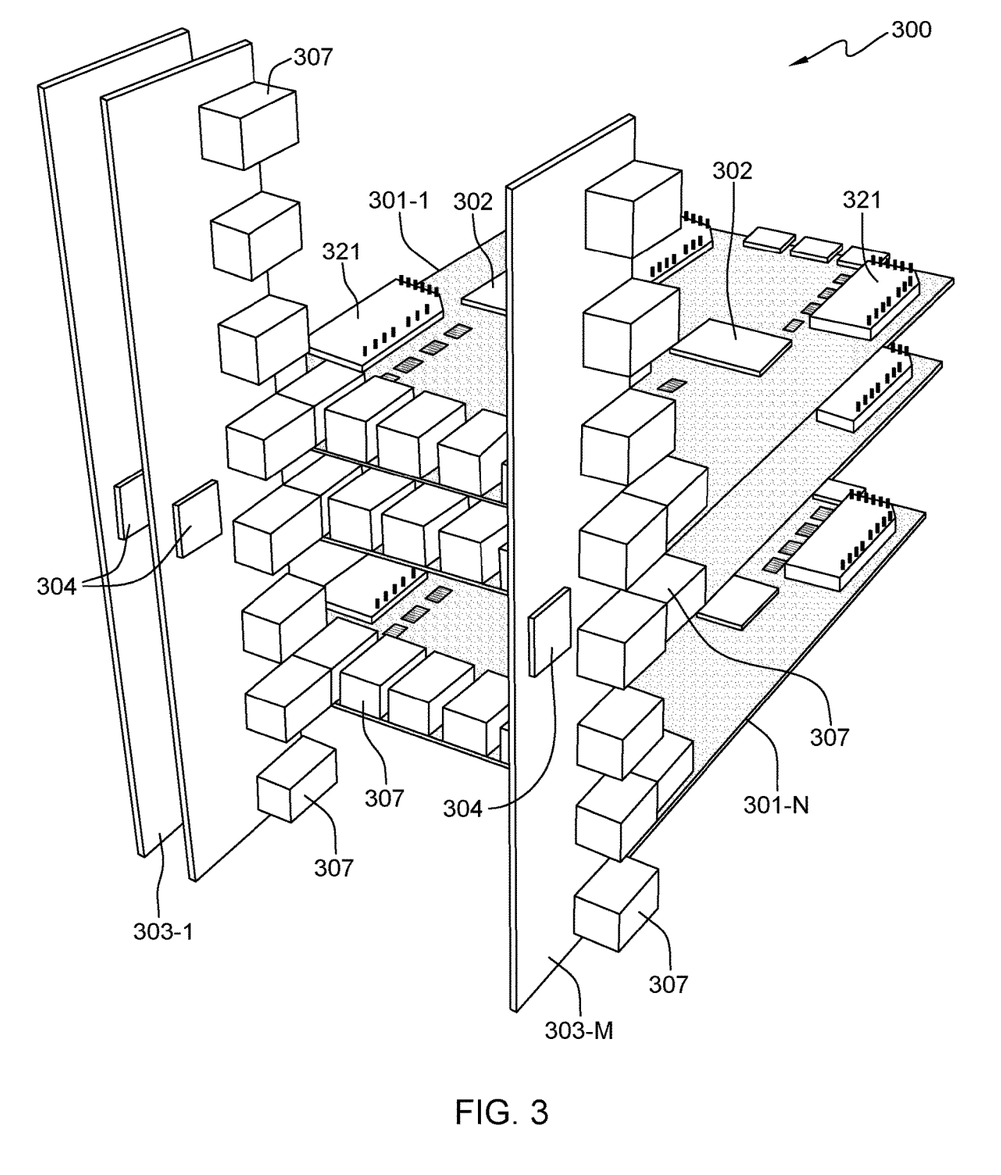
FIG. 3 is a depiction of one embodiment of an example leaf-spine topology for the computer system of FIG. 1.

FIG. 3 is a depiction of one embodiment of an example leaf-spine packaging 300 for computer system 100. Leaf-spine packaging 300 includes a plurality of CPU boards 301-1 . . . 301-N (collectively referred to as CPU boards 301) and a plurality of SC boards 303-1 . . . 303-M (collectively referred to as SC boards 303). Although only 3 CPU boards 301 and 3 SC boards 303 are shown for ease of illustration, it is to be understood that any suitable number of CPU boards 301 and SC boards 303 can be used. Furthermore, for computer system 100, the example packaging 300 includes 8 SC boards 303 and 8 CPU boards 301. Thus, each SC board 303 includes one SC chip 304 and each CPU board 301 includes two CPU chips 302 in this example. However, it is to be understood that, in other embodiments, other configurations can be used. For example, in some embodiments, each CPU board 301 includes one CPU chip 302. In such examples, 16 CPU chips use 16 CPU boards 301. Additionally, in some embodiments, each SC board 303 can include more than 1 SC chip. For example, in some such embodiments, each SC board 303 includes 2 SC chips. In such embodiments, 4 SC boards 303 could be used for the example computer system 100 instead of the 8 SC boards in the example of FIG. 4.

Figure 4:
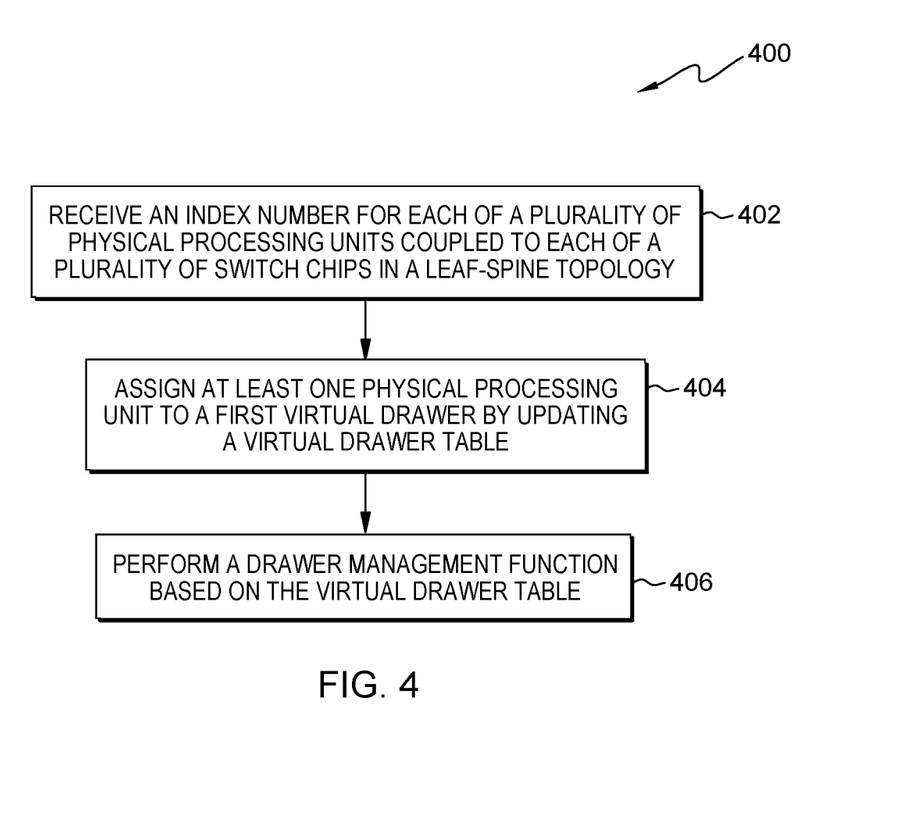
FIG. 4 is a flow chart depicting one embodiment of an example method of managing virtual drawers.

Each SC board 303 and each CPU board 301 in the example of FIG. 4 also include 8 orthogonal direct connectors 307. It is to be understood that the number of orthogonal direct connectors 307 included on each CPU board 301 is at least equal to the number of SC boards 303 in the packaging 300. Similarly, the number of orthogonal direct connectors 307 mounted on each SC board 303 is at least equal to the number of CPU boards 301 in the packaging 300. The orthogonal direct connectors 307 enable the SC boards 303 and the CPU boards 303 to be connected in an orthogonal-direct topology such that each CPU chip 302 is communicatively coupled with each SC chip 304.

It is to be understood that the leaf-spine packaging 300 is provided by way of example and that other configurations can be used in other embodiments. For example, it is to be understood that each CPU board 301 can include components similar to conventional CPU boards (e.g. memory chips, SMP links, etc.). In some embodiments, other components can be included on the CPU boards 301 and/or the SC boards 303. For example, in this embodiment, each CPU board 301 includes memory chips 321. However, in other embodiments, each SC board can include a memory chip in addition to or in lieu of the memory chips 321 on CPU boards 301. In some such embodiments, at least part of the memory on one or more SC boards 301 can be assigned to a virtual drawer. In some embodiments, each virtual drawer configured by drawer management module 106 can include one or more CPU boards 301 in some embodiments. In other embodiments in which multiple CPU chips 302 are included on each CPU board 301, each virtual drawer can include one or more CPU chips 301. Thus, each CPU chip on a CPU board 301 in such embodiments can be assigned to a different virtual drawer.

FIG. 4 is a flow chart depicting one embodiment of an example method 400 of managing virtual drawers. Method 400 can be implemented with drawer management module 106. For example, in some embodiments, method 400 can be implemented by executing instructions 210 on CPU 205 in FIG. 2 above. It is to be understood that the order of actions in example method 400 is provided for purposes of explanation and that the method can be performed in a different order in other embodiments. Similarly, it is to be understood that some actions can be omitted or additional actions can be included in other embodiments.

At block 402, an index number for each of a plurality of physical processing units is received. Each of the plurality of physical processing units is communicatively coupled to each of a plurality of switch chips in a leaf-spine topology, as discussed above. The index number can be received or obtained using techniques known to one of skill in the art.

At block 404, at least one of the plurality of physical processing units is assigned to a first virtual drawer by updating an entry in a virtual drawer table indicating an association between the respective index number of the at least one physical processing unit and an index of the first virtual drawer. It is to be understood that, as used herein, updating an entry can include both making changes to an existing entry in the virtual drawer table as well as creating a new entry in the virtual drawer table. Furthermore, where a virtual drawer table does not currently exist, updating an entry can include creating the virtual drawer table and creating a new entry in the table. In addition, as discussed above, in some embodiments, two virtual drawers can be used. Thus, updating an entry in a virtual drawer table can include updating a respective entry in each of the two virtual drawer tables.

At block 406, a drawer management function is performed based on the virtual drawer table. That is, as discussed above, one or both of a C2V table and a V2C table can be used to manage the performance of drawer management functions. For example, given the index of a physical CPU, the C2V table can be used to identify the index of the corresponding virtual drawer. Similarly, given the index of a virtual drawer, the V2C table can be used to identify the indices of the physical CPUs of the virtual drawer. Additionally, given the indices of the physical CPUs of the virtual drawer, the desired drawer management function can be performed on or using the physical CPUs of the virtual drawer.

Some example drawer management functions are discussed below. However, it is to be understood the drawer management functions discussed below are provided by way of example only and that other drawer management functions can be performed in lieu of or in addition to those examples discussed herein.

As discussed above, the assignment of physical processing units to virtual drawers using the virtual drawer tables enables flexibility in managing virtual drawers. For example, in some embodiments, a subset of the physical processing units can be selected for inclusion in a virtual drawer based on requirements of a workload to be executed. Thus, the workload can be executed more efficiently by the processing units of the virtual drawer since the number of processing units included in the virtual drawer is selected based on the specific requirements of the workload. The assignment of processing units to virtual drawers can be done automatically by the drawer management module or in response to user input received via a user input device.

Additionally, as discussed above, different virtual drawers can have different numbers of processing units. For example, in some embodiments, a first virtual drawer includes a first subset of the physical processing units and a second virtual drawer is assigned a second subset of the physical processing units where the number of processing units in the second subset is not equal to the number of processing units in the first subset. In addition, as discussed above, in some embodiments, a virtual drawer can include a single processing unit. Furthermore, a logical partition can be created from a plurality of virtual drawers, where each of the virtual drawers includes at least one physical processing unit. Thus, the virtual drawer table can be used to manage the computer system (e.g. a virtual drawer can be powered down, powered up, or rebooted based on the CPU assignments in the virtual drawer table). Additionally, the virtual drawer table can be used to manage workloads of a computer system. For example, a virtual drawer can added or removed from an LPAR running the workload and/or a workload can be moved from the CPUs associated with a first virtual drawer to the CPUs associated with a second virtual drawer based on entries in the virtual drawer table.

In addition, by using the virtual drawer table, a processing unit assigned to a virtual drawer can be replaced by another processing unit by updating the virtual drawer table to associate the index number of the other processing unit with the index of the virtual drawer and to remove the association between the index of the virtual drawer and the index of the original processing unit, as discussed above. Furthermore, as discussed above, a virtual drawer can include physical processing units on different CPU boards. For example, a first physical processing unit on a first board can be assigned to the same virtual drawer as a second physical processing unit on a second board by updating the virtual drawer table.

Thus, one example drawer management function enabled through use of the virtual drawer table includes providing the capability to concurrently increase the capacity of the system. For example, the capacity can be increased by concurrently activating more CPUs on a given virtual drawer or by adding a virtual drawer concurrently to an LPAR to activate more CPUs, more memory and/or more expansion devices. The additional CPUs can be activated on a given virtual drawer or added concurrently to an LPAR through appropriate modification of the virtual drawer table, as described herein.

Another example, drawer management function managed through the use of the virtual drawer table includes concurrent repair of drawers. Some systems, for example, require a minimum of physical drawers (e.g. 2 physical drawers) for concurrent drawer repair. Through the use of the virtual drawer table, smaller virtual drawers can be configured which make it easier to meet the system requirement of a minimum of 2 drawers to perform concurrent repair.

Also, the function of removing a drawer for upgrade or repair can be managed through the virtual drawer table, as described herein. For example, through the use of the virtual drawer table, the virtual drawers can be configured with finer granularity than physical drawers, as discussed herein. Thus, through appropriate modifications to the virtual drawer table, sufficient resources can be made available to accommodate resources that are rendered unavailable when the physical CPUs associated with a given virtual drawer are removed for upgrade or repair. Thus, the enhanced drawer availability allows the CPUs associated with a single virtual drawer to be removed and reinstalled concurrently for an upgrade or repair.

Another example drawer management function performed based on the virtual drawer table involves preventing loss of connectivity to Input/Output (I/O devices) when physical CPUs associated with a virtual drawer are removed. That is, removing the CPUs means that the I/O devices connected to the physical CPUs are lost. However, an I/O device can have an I/O interconnect to more than one CPU. Thus, for a given virtual drawer including multiple I/O devices, each I/O device connected to more than one CPU, there can be various subsets of CPUs which in aggregate connect to the I/O devices. The virtual drawer table can be modified to choose a subset which meets customer needs (e.g. such as meeting service level agreements, performing specific tasks, etc.). For example, through the use of the virtual drawer table, the number of CPUs being removed can be minimized. Physical drawers do not offer the same flexibility for interconnecting to I/O devices as through the use of virtual drawers managed by the virtual drawer tables.

Thus, as discussed above, the embodiments described herein enable the use of virtual drawers for various management functions while decoupling the assignment of processing units to virtual drawers from the physical packaging of the virtual drawers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
receiving an index number for each of a plurality of physical processing units, each of the plurality of physical processing units communicatively coupled to each of a plurality of switch chips in a leaf-spine topology;
assigning at least one of the plurality of physical processing units to a first virtual drawer by updating an entry in a virtual drawer table indicating an association between the respective index number of the at least one physical processing unit and an index of the first virtual drawer wherein the first virtual drawer includes a first subset of the physical processing units;
assigning a second subset of the plurality of physical processing units to a second virtual drawer by updating the virtual drawer table, wherein the number of physical processing units in the second subset is not equal to the number of physical processing units in the first subset; and
performing a drawer management function based on the virtual drawer table.

2. The computer-implemented method of claim 1, wherein the virtual drawer table includes at least one of a V2C table mapping virtual drawer indices to physical processing unit indices or a C2V table mapping physical processing unit indices to virtual drawer indices.

3. The computer-implemented method of claim 1, further comprising:
selecting the second subset of the physical processing units for inclusion in the second virtual drawer based on requirements of a workload to be executed; and
executing the workload using the second subset of physical processing units assigned to the second virtual drawer.

4. The computer-implemented method of claim 1, further comprising creating a logical partition comprising a plurality of virtual drawers, wherein each of the plurality of virtual drawers is assigned, in the virtual drawer table, at least one physical processing unit of the plurality of physical processing units.

5. The computer-implemented method of claim 1, further comprising:
replacing the at least one physical processing unit assigned to the first virtual drawer with a second physical processing unit by updating the virtual drawer table to associate the virtual drawer index of the first virtual drawer with an index of the second physical processing unit and to remove the association of the virtual drawer index of the first virtual drawer with the index of the at least one physical processing unit.

6. The computer-implemented method of claim 1, wherein assigning the at least one physical processing unit to the first virtual drawer comprises:
assigning a first physical processing unit on a first board to the first virtual drawer by updating the virtual drawer table; and
assigning a second physical processing unit on a second board to the first virtual drawer by updating the virtual drawer table.

7. The computer-implemented method of claim 1, further comprising laying out memory addresses for the first virtual drawer such that within the first virtual drawer the memory addresses are contiguous and interleaved across the at least one physical processing unit assigned to the first virtual drawer.

8. A computer system comprising:
a plurality of central processing unit (CPU) boards, each CPU board including one or more physical CPU chips each having a respective index number and a first plurality of orthogonal-direct connectors;
a plurality of switch chip (SC) boards, each SC board including at least one switch chip and a second plurality of orthogonal-direct connectors, wherein each of the orthogonal-direct connectors in the second plurality of orthogonal-direct connectors is configured to connect with a corresponding one of orthogonal-direct connectors in the first plurality of orthogonal-direct connectors on each of the plurality of CPU boards such that the plurality of CPU boards and the plurality of SC boards are connected in an orthogonal-direct topology;
a memory configured to store a virtual drawer table; and
a processing unit communicatively coupled to the memory and configured to update the virtual drawer table to indicate an association between the respective index number of at least one physical CPU chip and an index of a first virtual drawer such that the at least one physical CPU chip is assigned to the first virtual drawer based on the association in the virtual drawer table;
wherein the processing unit is configured to perform a drawer management function based on the virtual drawer table.

9. The computer system of claim 8, wherein the processing unit is a CPU chip on one of the plurality of CPU boards.

10. The computer system of claim 8, wherein the virtual drawer table includes at least one of a V2C table mapping virtual drawer indices to physical CPU chip indices or a C2V table mapping physical CPU chip indices to virtual drawer indices.

11. The computer system of claim 8, wherein the processing unit is further configured to:
select a first plurality of physical CPU chips on one or more CPU boards for inclusion in a second virtual drawer, the number of physical CPU chips in the first plurality of CPU chips based on requirements of a workload to be executed;
assign the selected first plurality of the physical CPU chips to the second virtual drawer by updating the virtual drawer table; and
wherein the workload is executed using the first plurality of physical CPU chips assigned to the second virtual drawer.

12. The computer system of claim 8, wherein the processing unit is configured to create a logical partition comprising a plurality of virtual drawers, wherein each of the plurality of virtual drawers is assigned, in the virtual drawer table, at least one physical CPU chip.

13. The computer system of claim 8, wherein the first virtual drawer includes a first subset of physical CPU chips; and wherein the processing unit is configured to assign a second subset of physical CPU chips to a second virtual drawer by updating the virtual drawer table, wherein the number of physical CPU chips in the second subset is not equal to the number of physical CPU chips in the first subset.

14. The computer system of claim 8, wherein the processing unit is configured to:

replace the at least one physical CPU chip assigned to the first virtual drawer with a second physical CPU chip by updating the virtual drawer table to associate the virtual drawer index of the first virtual drawer with an index of the second physical CPU chip and to remove the association of the virtual drawer index of the first virtual drawer with the index of the at least one physical CPU chip.

15. The computer system of claim 8, wherein within the first virtual drawer, memory addresses are contiguous and interleaved across the at least one physical CPU chip assigned to the first virtual drawer.

16. A computer program product comprising a computer readable storage medium having a computer readable program stored therein, wherein the computer readable program, when executed by a processor on a first vehicle, causes the processor to:

receive an index number for each of a plurality of physical processing units, each of the plurality of physical processing units communicatively coupled to each of a plurality of switch chips in a leaf-spine topology;

assign at least one of the plurality of physical processing units to a first virtual drawer by updating an entry in a virtual drawer table indicating an association between the respective index number of the at least one physical processing unit and an index of the first virtual drawer wherein the first virtual drawer includes a first subset of the physical processing units;

assign a second subset of the plurality of physical processing units to a second virtual drawer by updating the virtual drawer table, wherein the number of physical processing units in the second subset is not equal to the number of physical processing units in the first subset; and perform a drawer management function based on the virtual drawer table.

17. The computer program product of claim 16, wherein the computer readable program is further configured to cause the processor to:

replace the at least one physical processing unit assigned to the first virtual drawer with a second physical processing unit by updating the virtual drawer table to associate the virtual drawer index of the first virtual drawer with an index of the second physical processing unit and to remove the association of the virtual drawer index of the first virtual drawer with the index of the at least one physical processing unit.

18. The computer program product of claim 16, wherein the computer readable program is further configured to cause the processor to lay out memory addresses for the first virtual drawer such that within the first virtual drawer the memory addresses are contiguous and interleaved across the at least one physical processing unit assigned to the first virtual drawer.

* * * * *